US00RE36639E

United States Patent [19]

Okhai

[11] E Patent Number: Re. 36,639

[45] Reissued Date of Patent: Apr. 4, 2000

[54] PLASTIC CONTAINER

[75] Inventor: Aziz A. Okhai, Dundee, United Kingdom

[73] Assignee: North American Container, Inc., Flower Mound, Tex.

[21] Appl. No.: 08/649,918

[22] Filed: May 16, 1996

Related U.S. Patent Documents

Reissue of:

[64] Patent No.: 5,072,841
Issued: Dec. 17, 1991
Appl. No.: 07/577,799
Filed: Sep. 5, 1990

U.S. Applications:

[62] Continuation of application No. 08/166,744, Dec. 14, 1993, abandoned, which is a continuation of application No. 07/112,607, filed as application No. PCT/GB87/00102, Feb. 12, 1987, abandoned.

[30] Foreign Application Priority Data

Feb. 14, 1986 [GB] United Kingdom ..... 8603709
Feb. 25, 1986 [GB] United Kingdom ..... 8604660

[51] Int. Cl.[7] ..... B65D 1/02; B65D 23/00

[52] U.S. Cl. ..... 215/375; 215/373; 220/606; 220/608

[58] Field of Search ..... 220/606, 609; 215/373–375

[56] References Cited

U.S. PATENT DOCUMENTS

| | | | |
|---|---|---|---|
| 3,511,401 | 5/1970 | Lachner | 215/1 C |
| 3,727,783 | 4/1973 | Carmichael | 215/1 C |
| 3,733,309 | 5/1973 | Wyeth et al. | 215/1 C X |
| 3,870,181 | 3/1975 | Sincock | 215/1 C |
| 3,881,621 | 5/1975 | Adomaitis . | |
| 3,935,955 | 2/1976 | Das | 220/606 X |
| 4,231,483 | 11/1980 | Dechenne et al. | 215/1 C X |
| 4,247,012 | 1/1981 | Alberghini | 215/1 C |
| 4,249,667 | 2/1981 | Pocock et al. | 215/1 C |
| 4,318,489 | 3/1982 | Snyder et al. . | |
| 4,381,061 | 4/1983 | Cerny et al. | 215/371 X |
| 4,467,929 | 8/1984 | Jakobsen et al. | 215/1 C |
| 4,620,639 | 11/1986 | Yoshino | 220/606 X |
| 4,755,404 | 7/1988 | Collette | 215/1 C |

FOREIGN PATENT DOCUMENTS

| | | | |
|---|---|---|---|
| 2082 | 5/1979 | European Pat. Off. . | |
| 42132 | 12/1981 | European Pat. Off. . | |
| 2217219 | 9/1974 | France . | |
| 2471921 | 6/1981 | France . | |
| 2067160 | 7/1981 | United Kingdom | 220/606 |
| 8605462 | 9/1986 | WIPO | 220/606 |

*Primary Examiner*—Sue A. Weaver
*Attorney, Agent, or Firm*—Steven R. Trybus; Roper & Quigg

[57] ABSTRACT

A container of blow-moulded oriented thermoplastic material includes a base structure comprising a convex annular surface (which may be divided into a plurality of feet (118) by radial webs (112) and a central re-entrant portion (116). In blow-moulding the container, a moulded preform is enclosed within a mould heated, and stretched such that its bottom surface impinges upon a projecting surface of the mould bottom corresponding to the topmost surface (158) of the re-entrant portion. After blow-moulding, the material of the re-entrant portion (116) remains unoriented and relatively thick in comparison to the material of the remainder of the base. The unoriented material in the base is substantially confined to the re-entrant portion (116) which itself is strengthened by its relatively thick walls and the base thus exhibits improved creep and stress cracking properties.

42 Claims, 5 Drawing Sheets

AMENDED

PLASTIC CONTAINER

Matter enclosed in heavy brackets [ ] appears in the original patent but forms no part of this reissue specification; matter printed in italics indicates the additions made by reissue.

[This] *This is a continuation of reissue application Ser. No. 08/166,744 of Dec. 14, 1993 now abandoned, which* is a continuation of application Ser. No. 112,607 filed as PCT/GB87/00102, Feb. 12, 1987, published as WO87/04974, Aug. 27, 1987, now abandoned.

The present invention is concerned with plastics containers and particularly with blow-moulded plastic bottles made from oriented thermoplastic materials such as PET and intended for use as containers for carbonated beverages.

The use of blow-moulded bottles as containers for pressurized liquids such as carbonated soft drinks, beers, ciders etc. presents a number of problems. In particular, the internal pressure generated by such liquids tends to distort the thin, flexible walls which are characteristic of blow-moulded bottles. This applies particularly to the base portion of the bottle.

Previously, this problem has been obviated by the use of a hemispherical base which distributes the pressure as evenly as possible and thus prevents distortion. Such a base is, however, inherently unstable and some means is required to allow the bottle to be free-standing. One approach is to attach a basecup to the hemispherical base, but this obviously increases manufacturing costs. There are also problems with adhesion and inaccurate positioning of the basecup which may result in a bottle which does not stand vertically.

Accordingly attempts have been made to produce a one-piece, blow-moulded bottle which is usable with pressurized liquids.

There have been many proposals for designs of such bottles, generally including either bases having a central concave portion, or a generally convex base with a plurality of stabilizing feet blown out therefrom, however none of these have been totally satisfactory in use. Problems encountered include creep and distortion of the bottle material, stress cracking, and poor resistance to impact. A typical bottle base is shown in FIG. 1 of the accompanying drawings and comprises a generally hemispherical section 2 having stabilizing feet 4 blown out therefrom. Such bottles are blow-moulded from an injection moulded preform as follows: the preform is heated, enclosed within a mould corresponding to the desired shape of the bottle, stretched by a stretch-rod inserted through the neck of the preform, and then blown. The stretch-rod stretches the preform to the full length of the mould so that the bottom of the preform impinges upon the bottom of the mould. The material which contacts the bottom of the mould at this stage is "frozen" so that when the bottle is blown the material around the centre of the base remains unoriented and relatively weak. In a bottle such as that of FIG. 1 this area of unoriented material extends well into the feet 4 of the base so that the base structure is weakened and becomes subject to creep and distortion. Additionally, the transition from unoriented to oriented material is relatively abrupt, creating weak points where the transition occurs and reducing the resistance of the base to stress cracking or the like. These problems can obviously be overcome by making the base thicker; however this increases the amount of material required and hence the weight of the bottle. Thus, the advantages of a one piece bottle over a conventional base cupped bottle are substantially reduced.

It is an object of the present invention to obviate or mitigate these disadvantages.

Accordingly, the invention provides a container of blow-moulded oriented thermoplastic material which is formed by enclosing a heated moulded preform within a mould corresponding to the shape of the container and stretching it to the full length of the mould so that its bottom surface impinges upon the bottom surface of the mould prior to blow-moulding, said container comprising a generally cylindrical body portion and a base portion closing the bottom end of said body portion wherein said base portion is a figure of rotation formed by rotating a generally convex curve extending from the bottom of said side wall to the central longitudinal axis of the container about said central axis so as to define an annular convex surface having a central re-entrant portion, and wherein said preform, when stretched prior to blow-moulding, impinges upon a projecting central portion of the bottom of the mould corresponding to said re-entrant portion, such that, when blow-moulded, the material in the vicinity of said re-entrant portion remains unoriented and relatively thick in comparison with the oriented material of the remainder of the base portion.

Preferably the base portion is provided with a plurality of radial webs extending from the bottom of the body portion towards the centre of the base portion and dividing said annular convex surface into a plurality of feet spaced around the circumference of the base.

According to a second aspect of the invention, a plastic container comprises a generally cylindrical body portion and a base portion closing the bottom end of said body portion, said base portion comprising an annular convex surface having a central re-entrant portion, the walls of said re-entrant portion being substantially thicker than the walls of the remainder of said base portion.

The ratio of the thickness of the walls of the re-entrant portion to the walls of the remainder of the base portion is preferably in the range 1.2:1 to 10:1, and the angle of divergence of the side walls of the re-entrant portion is preferably less than 60°. It is also preferred that the diameter of the re-entrant portion is in the range 5% to 30% of the overall base diameter and more preferably in the range 10% to 20% thereof.

Embodiments of the invention will now be described, by way of example only, with reference to the accompanying drawings in which:

FIGS. 4 to 9 show variations of the base of FIGS. 2 and 3, wherein FIG. 4 shows a base comprising part-circular, arcuate portions;

FIG. 5 shows a base comprising semi-elliptical portions;

FIG. 6 shows a base including straight line and part-circular portions;

FIG. 7 shows a base modified by the addition of convex, stabilizing projections;

FIG. 8 shows a base modified by the addition of strengthening and stabilizing concavities; and FIG. 9 shows a base comprising a combination of part-circular arcs of differing radii and centers of curvature;

Figure 2:
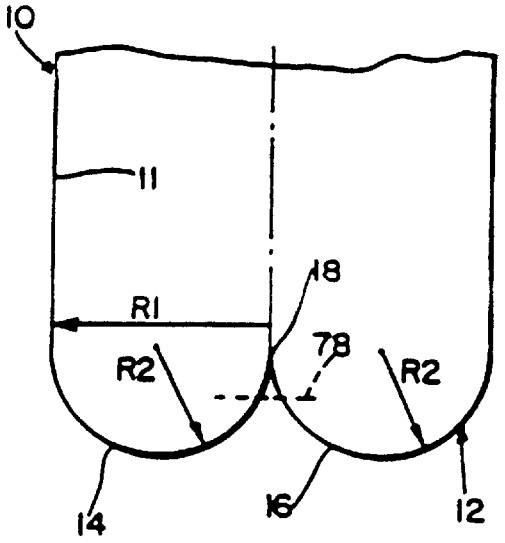
FIG. 2 is a diametrical cross-section of the base portion of a container forming the basis of the present invention.
Figure 3:
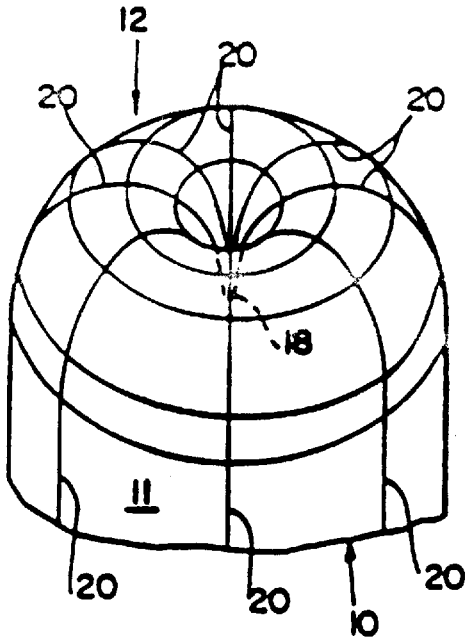
FIG. 3 is a perspective view of the base of FIG. 2.

Referring now to the accompanying drawings, FIGS. 2 and 3 show the base of a blow-moulded container, such as a bottle 10 having a generally cylindrical side wall 11 of radius R1, an upper neck portion (not shown) and a base portion 12 closing the bottom end of the wall 11. In diametrical cross-section the base 12 comprises first and second downwardly convex semicircular portions 14 and 16, having radii R2 equal to half the radius R1, extending downwardly from the side wall 11 and converging at the mid-point of the base portion 12 to form a cusp 18.

The shape of the base 12 is shown in FIG. 3 wherein each of the "longitudinal" lines 20 corresponds to the sectional outline of FIG. 2 and is essentially a figure of revolution of one of the semicircular portions 14 and 16 about the central longitudinal axis of the bottle 10, defining an annular convex surface having a central re-entrant portion.

In blow-moulding a base of this shape, stretching the preform causes the bottom thereof to contact the base of the mould only at the point of the cusp 18 so that unoriented material in the base portion 12 is restricted virtually to that point only. Variations in this basic shape are shown in FIGS. 4 to 7.

Figure 4:
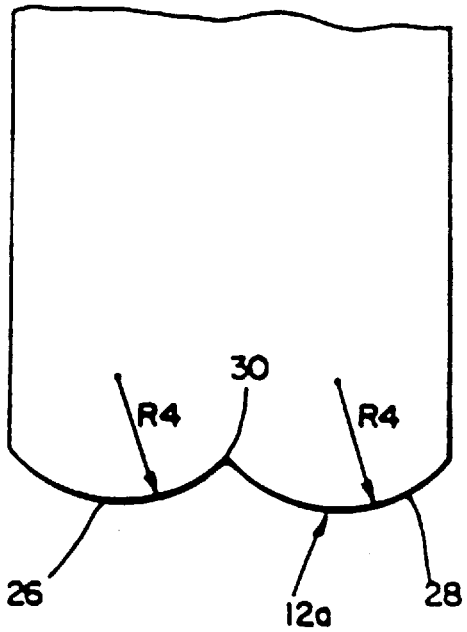
Figure 5:
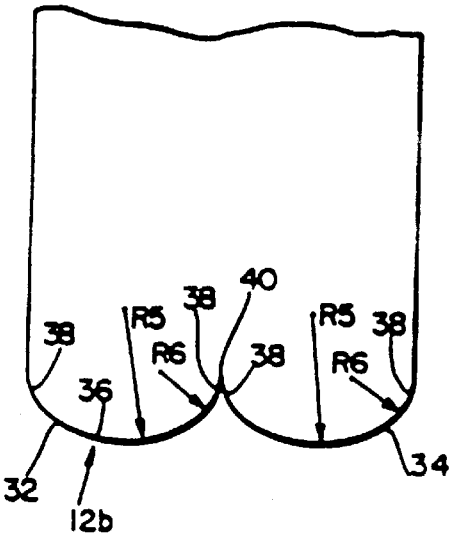

The base 12a of FIG. 4 comprises first and second circular arcs 26, 28, having radii R4 greater than half R1, and converging at a point 30, and the base 12b of FIG. 5 comprises first and second semi-elliptical portions 32, 34—each having a bottom portion 36 of radius R5, again greater than half R1, and outer and inner peripheral portions 38 of radius R6, less than half R1—converging at point 40.

Figure 1:
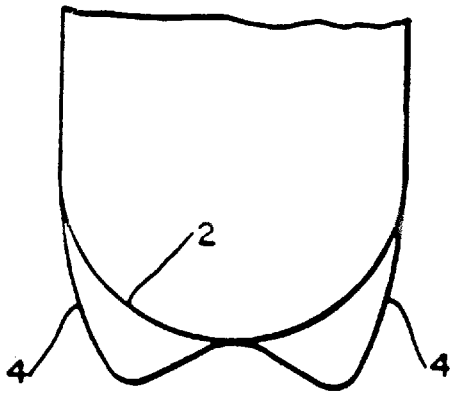
FIG. 1 (PRIOR ART)
FIG. 1 illustrates the prior art, as discussed above.
Figure 6:
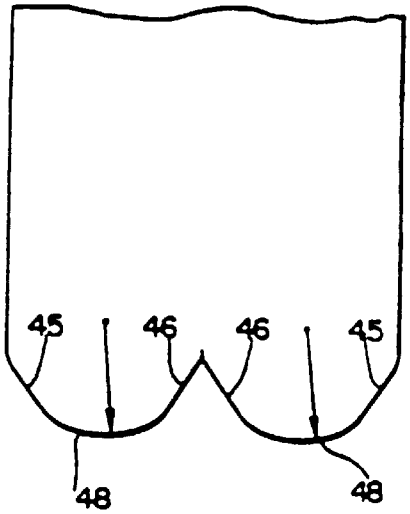

FIG. 6 shows a base similar to that of FIG. 1 having semicircular portions 48 wherein straight line portions 45, 46 are incorporated into the outer and inner walls of the semicircular portions 48. The straight line portions 45 thus form an upwardly diverging frusto-conical section around the outside of the base and the straight line portions 46 form a downwardly diverging frusto-conical section around the central re-entrant portion. Such straight line portions may similarly be incorporated into the bases of FIGS. 4 and 5, and more than one straight line portion may be incorporated into both the inner and outer walls.

Figure 7:
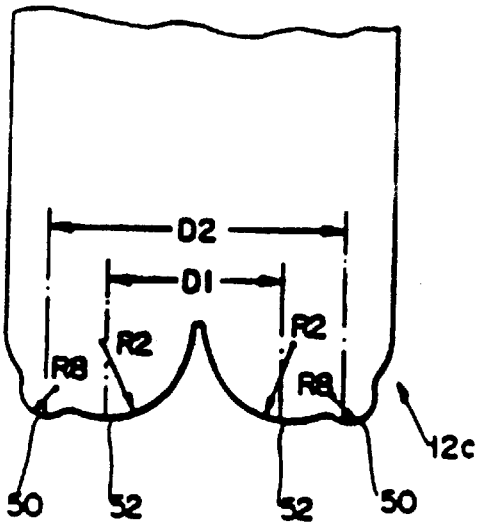

FIG. 7 shows a further modification of the basic shape of FIG. 1 wherein the semicircular portions 52 of the base 12c with peripheral, outwardly convex projections 50, of radius R8. These projections 50 serve to increase the effective base diameter from D1 to D2 and so improve the stability of the bottle. The projections 50 may form a continuous peripheral rim or may be formed as a plurality of discrete "blisters" spaced around the circumference of the base. This modification can also be applied to the bases of FIGS. 4, 5 and 6.

Figure 8:
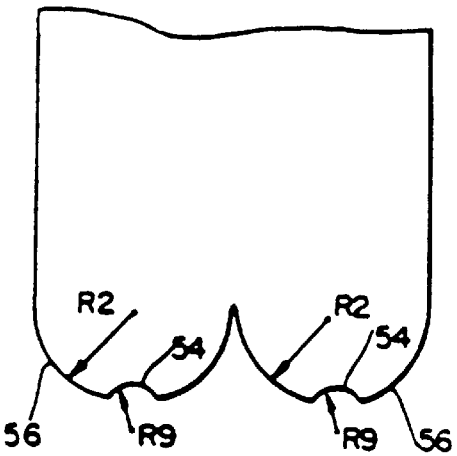

FIG. 8 illustrates a further feature which may be incorporated into any of the bases described; that is, an upwardly concave portion 54 of radius R9 formed in the bottom of each convex portion 56. This further strengthens the base and gives some improvement in stability.

Figure 9:
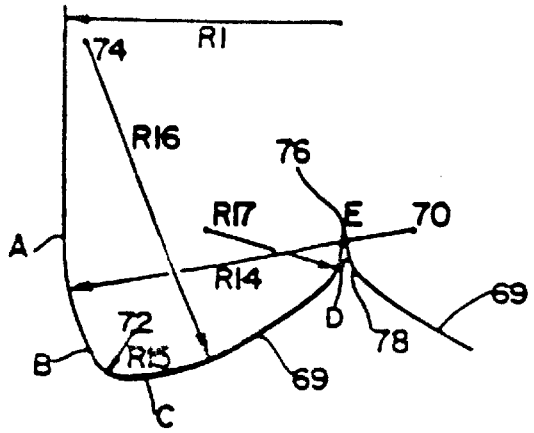

The shape of the convex portions of the base may be further varied as shown in FIG. 8 to increase the effective base diameter and hence the stability of the bottle. In FIG. 9, each convex portion 69 comprises a first convex arcuate portion AB of radius R14 (greater than half the radius R1 of the cylindrical body portion) and centre of curvature 70, extending from the bottom of the cylindrical wall of the bottle, a second convex arcuate portion BC of radius R15, less than R1, and centre 72 which forms the apex of the convex portion 69, and a third convex arcuate portion CD of radius R16, greater than R1 and centre 74, extending upwardly towards the centre of the bottle. A cusp 76 is formed by arcs DE of radius R17, half R1 or less than R16. Additionally, the portions AB and CD may be replaced by, or include, generally straight-lined portions as previously described in relation to FIG. 6.

As previously explained, the bases described thus far substantially eliminate any unoriented material from *areas other than the center of the bottom surface* and are useful in many applications. It has been found, however, that they may not be sufficiently strong to prevent their re-entrant portions being blown out by the internal pressures generated by more highly pressurized liquids, especially in larger bottle sizes. This can be prevented by thickening the wall of the re-entrant portion, which may be accomplished by reintroducing an amount of unoriented material into the re-entrant portion.

This may be achieved simply by truncating the central cusp 18, as at dotted line 78 of FIG. 2. In this way the bottom of the preform, when stretched, contacts a projecting surface of the bottom of the mould so that a limited amount of relatively thick unoriented material is present around the centre of the base when the bottle is blown. This strengthens the re-entrant portion but will not materially affect the overall strength of the base so long as the unoriented material is restricted substantially to the re-entrant portion itself.

It has also been found that the shape and size of the re-entrant portion is important in obtaining a sufficiently strong structure. For example, by simply truncating the cusp 18 of FIG. 2 as described, the sides of the re-entrant portion diverge at a relatively large angle so that its resistance to deformation is limited. It is preferred, therefore to modify the shape of the re-entrant portion such as is shown in FIGS. 10 and 11.

Figure 10:
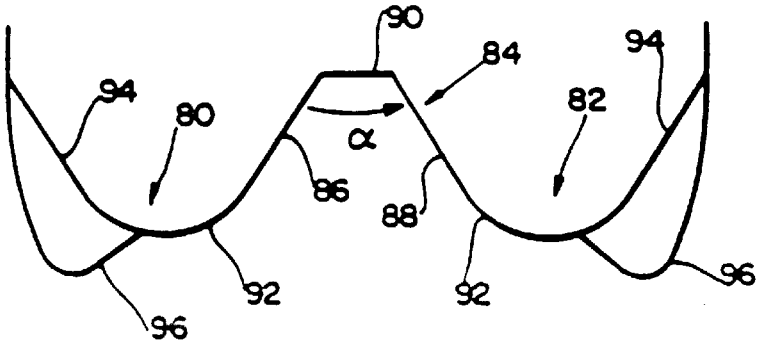
FIGS. 10 and 11 are diametrical cross-sections of further modified base portions.

The base of FIG. 10 comprises first and second downwardly convex portions 80, 82 as before. In this case, however, the re-entrant portion has been modified to take the form of a truncated cone 84 having relatively steep sides 86, 88 and closed by a substantially flat top surface 90. The remainder of the convex portions 80,82 may each comprise, for example, an arcuate bottom portion 92 and a straight line outer side wall 94. As illustrated, the base is further provided with peripheral stabilizing feet 96 spaced around its circumference.

Figure 11:
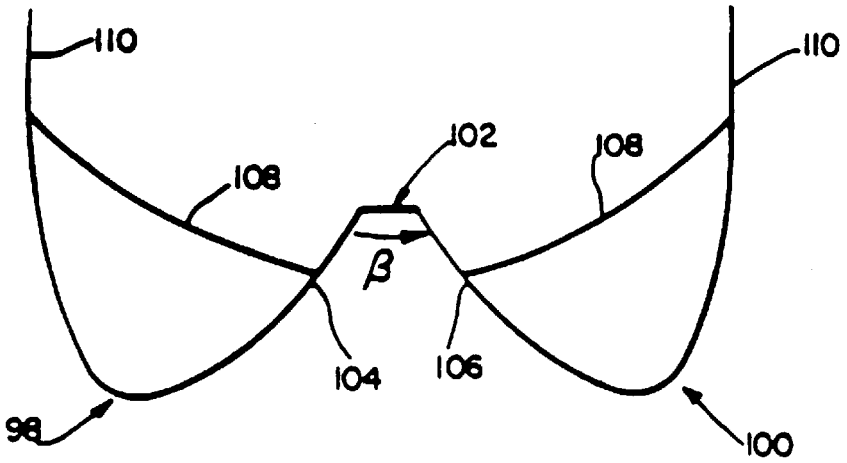

The base of FIG. 11 comprises first and second convex portions 98, 100, somewhat similar to those of FIG. 9, and having its central re-entrant portion modified in a similar manner to that of FIG. 10 so as to define a flat-topped, truncated cone 102 extending upwardly from the points 104, 106. This base is further modified by the introduction of radial webs 108 extending from the base of the side walls 110 of the container to the base of the central truncated cone 102. These serve to further strengthen the base by dividing the annular surface defined by rotation of the convex portions 98, 100 into a plurality of segments.

As explained above, when moulding bases of FIGS. 10 and 11, the stretched preform impinges upon the projecting surface of the mould-bottom corresponding to the top surface of the truncated cones 84, 102 such that the material in the vicinity of this surface remains unoriented and relatively thick when the bottle is blown, such unoriented material being largely confined to the cones 84, 102 themselves.

A further advantage which arises from moulding a bottle in this shape is that the *the area of unoriented relatively thick material contains and protects the gate area of the preform*

*and provides* a gradual transition between unoriented and oriented material [is obtained] *and reduces stress on the transition between the unoriented and oriented material to prevent separation* so that the weak points created by the abrupt transition observed in conventional bottles are eliminated. Thus, in the present case, the strength of the base will not be so greatly affected if the unoriented material does extend beyond the [central truncated cone] *center of the bottom surface*. This factor is particularly relevant to the enhanced resistance of the base to stress cracking.

Figure 12:
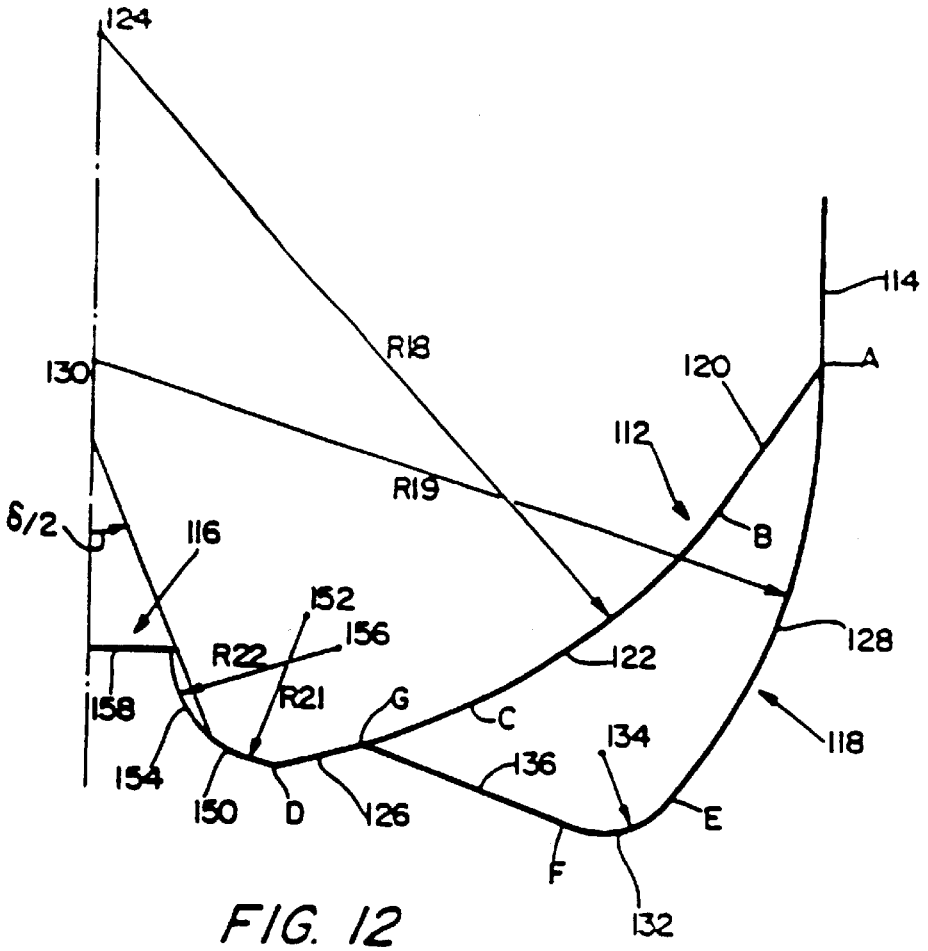
FIGS. 12 and 13 are respectively a sectional side and a bottom view of a particularly preferred embodiment of the invention.
Figure 13:
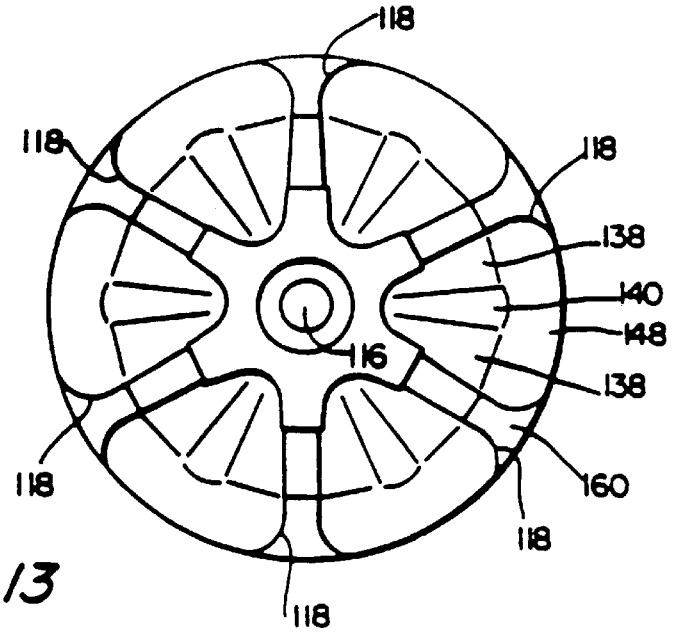

FIGS. 12 and 13 show a particularly preferred embodiment of the invention somewhat similar to that of FIG. 11. As in FIG. 11, the base is divided into segments by radial webs 112 extending from the vertical side wall 114 of the bottle to the bottom of the central re-entrant portion 116, thereby defining a plurality of stabilizing feet 118. Each web 112 comprises a first straight line portion 120 extending downwardly and inwardly from point A to point B at an angle of 32° to the vertical, an arcuate portion 122 of radius R18 and centre 124 extending from point B to point C, and a second straight line portion 126 extending from point C to point D at an angle of 17° to the horizontal. In profile, the feet 118 each comprise a first arcuate portion 128 of radius R19 and centre 130 extending from point A to point E, a second arcuate portion 132 of radius R20 and centre 134 extending from point E to point F, and a straight line portion 136 extending upwardly and inwardly at an angle of 20° to the horizontal to meet the second straightline portion of the web 112 at point G. The feet 118 themselves preferably comprise generally planar lateral and bottom surfaces 138 and 140 and a curved outer surface 148.

The central re-entrant portion 116 is radiused into the web 112 at point D by an arcuate portion 150, radius R21 and centre 152, and the side walls thereof are defined by a further arcuate portion 154, radius R22 and centre 156. The upper end of the re-entrant portion is closed by a substantially flat surface 158. As is best seen in FIG. 13, the webs 112 define generally convex strips of material 160 such that the feet 118 are spaced from one another around the circumference of the base. As illustrated the base is provided with six feet 118.

Suitable dimensions for a two liter bottle as shown in FIGS. 12 and 13 are as follows: overall radius of base—53 mm; R18—60 mm; R19—40 mm; R20—5 mm; R21—10 mm; R22—10 mm. The top surface 158 of the re-entrant portion 116 is 10 mm in diameter and the re-entrant portion 116 itself is 7.5 mm deep. A one liter bottle might have a base radius of 44.3 mm with the other dimensions scaled accordingly.

In some cases, it may be preferable to replace the flat top surface 158 of the re-entrant portion 116 with an upwardly domed surface. The profile of the radial webs 112 may also be varied to comprise different combinations of arcuate and/or straight line portions.

The diameter of the re-entrant portion 116 should be to a range of 5% to 30% of the overall base diameter and preferably in the range 10% to 20% and the angle of divergence of the sidewalls of the re-entrant portion preferably less than 60°. Additionally, as previously stated, the unoriented material forming the walls of the re-entrant portion 116 is thicker than the walls of the remainder of the base and the ratio of the thicknesses of these walls should be in the range 1.2:1 to 10:1. Outside this range the base may be blown out due to internal pressure so that the thickness of the base as a whole would have to be increased, increasing the weight and cost of the bottle.

Figure 14:
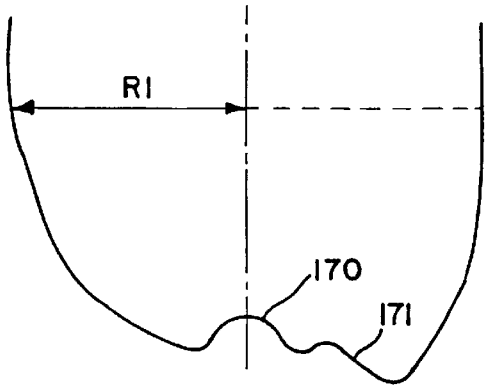
FIGS. 14 and 15 are sectional side views of containers similar to that of FIGS. 12 and 13.
Figure 15:
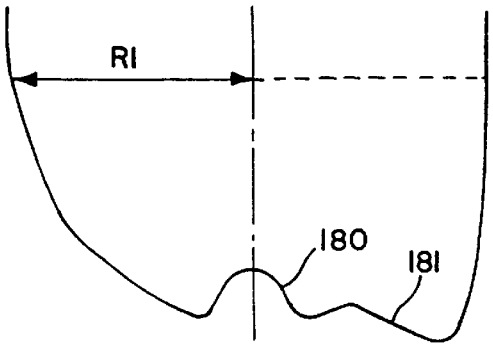
Figure 16:
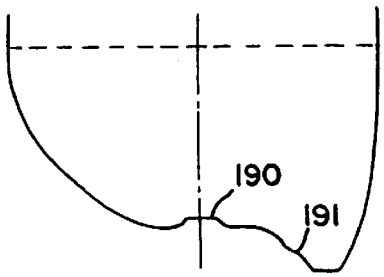
FIG. 16 (PRIOR ART)
[FIG. 16 shows a conventional plastics container for comparison with FIGS. 14 and 15.]

FIGS. 14 and 15 show bottles similar to that of FIGS. 12 and 13 which were subjected to [comparative] tests [with a conventional one piece blow-moulded bottle as shown in FIG. 16]. The test procedures and results are detailed below.

EXAMPLES 1 AND 2

Polyethylene phthalate resin (I.V. 0.76, available from ICI Ltd) was injection moulded to form preforms of 36 grams for a 1 liter volume bottle and of 53 grams for a 2 liter volume bottle. The injection moulding machine was model XL225 sold by HUSKY Co with a mould for 32 pieces. The temperature for moulding was about 260° C. to 280° C. 1 liter volume bottles corresponding to the shape shown in FIG. 14 (Example 1) and 2 liter volume bottles corresponding to the shape shown in FIG. 15 (Example 2) were made from the above preforms under the following conditions:

Blow moulding machine: Corpoplast Co B-40

Blow moulding temperature: about 90° C.

Blow moulding pressure: about 40 bar

Ten each of the bottles of Examples 1 and 2 were measured by the following methods. The results are shown as an average of ten bottles in Table 1.

(1) Thickness of the wall

The thickness of the walls of the portions 170 and 171 in FIG. 14 and of the portions 180 and 181 in FIG. 15 was measured by a micrometer after cutting the bottom (2) Density In order to know the degree of orientation, the portions or pieces where the wall thickness was measured were subject to measurement of their density by a density-gradient tube.

(3) Internal pressure test

Into the bottles, water was charged in an amount of 1 liter (Example 1) or 2 liters (Example 2) and sodium bicarbonate and citric acid were added in such an amount that the carbonic acid gas volume corresponds to 4 volumes. After the bottles were allowed to stand at 40° C. for 24 hours, the degree of deformation of the bottom of the bottles was determined visually. The standards of the estimation of the deformation were the following A, B, and C:

A: Substantially no deformation

B: Deformation was observed but self-standing ability was kept

C: Significant deformation and impossibility of self standing (4) Creep test

The same procedures as those of the internal pressure test were repeated, that is, the bottles were charged with water and kept at 4 volumes of the carbonic acid gas volume and allowed to stand at 40° C. for 24 hours. Then, the increased volume of the bottles was determined in percent based on the original volume of the bottles.

COMPARATIVE EXAMPLES 2 liter volume bottles [having the shape as shown in FIG. 16] were commercially obtained and measured by the same methods as those of Examples 1 and 2. The results are shown in Table 1.

TABLE 1

| | Example 1 | Example 2 | [Comparative] [Example] |
|---|---|---|---|
| Weight of bottle (g) | 36 | 53 | [57] |
| Volume of bottle (l) | 1 | 2 | [2] |

TABLE 1-continued

| | Example 1 | Example 2 | [Comparative] [Example] |
|---|---|---|---|
| Wall thickness (mm) (measured portions) | | | |
| Re-entrant portion | 2.00(170) | 2.05(180) | [2.00(190)] |
| Adjacent portion | 0.28(171) | 1.05(181) | [2.32(191)] |
| Density at 23° C., 50% *relative humidity* (g/cc) | | | |
| Re-entrant portion | 1.330[(130)]*(170)* | 1.330[(140)]*(180)* | [1.330(150)] |
| Adjacent portion | 1.350[(131)]*(171)* | 1.340[(141)]*(181)* | [1.330(151)] |
| Estimation of Internal pressure test | A | B | [B] |
| Creep (%) | 2.8 | 3.8 | [6.0] |

As seen in the above, it was found that the bottles of Examples 1 and 2 are not deformed and keep their self-standing ability even under a high internal pressure due to contents such as carbonated drinks. Moreover, [in the bottles of Examples 1 and 2, even if the wall thickness of the portions 171 (in FIG. 14) and 181 (in FIG. 15) is smaller than that of the corresponding portion 191 (in FIG. 16) of the bottle of Comparative Example,] the bottles of the Examples 1 and 2 have no problem of internal pressure deformation and stress cracking, which allows the bottle weight to be reduced. [Further, the creep characteristics are superior in the bottles of Examples 1 and 2 to that of the Comparative Example.]

By controlling the presence of unoriented material in the base structure and the thickness of the walls of the re-entrant portion, the present invention provides a one piece blow-moulded plastic container having materially improved creep and stress cracking properties when compared with existing one piece bottles, so allowing a significant reduction in the weight of the bottle and hence in production costs.

In addition, the preferred embodiment illustrated in FIGS. 12 and 13 provides a wider effective base diameter than existing bottles and is therefore more stable on filling lines during the bottling process. The webs 112 also help to brace the base against deformation and the general shape of the feet 118 is chosen to minimize the effects of the internal pressure exerted thereon. These features provide a base structure which is inherently resistant to deformation and which is further enhanced by the presence of the thickened re-entrant portion 116 as described herein.

I claim:

1. A container of blow-moulded oriented thermoplastic material of the type formed by enclosing a moulded preform in a mould corresponding to the shape of the container, heating the preform and stretching it to the full length of the mould so that its bottom surface impinges upon the bottom surface of the mould prior to blow-moulding; said container comprising a generally cylindrical body portion with a central longitudinal axis, said body portion having a side wall, a radius and a base portion closing the bottom end of said side wall, wherein said base portion is defined by a figure of rotation formed by rotating a generally convex curve, extending from the bottom end of said side wall to the central longitudinal axis of the body portion, about said axis so as to define an annular, convex surface having a central re-entrant portion, the material in the vicinity of the center of said re-entrant portion being unoriented and relatively thick in comparison with the oriented material of the remainder of the base portion and wherein said annular, convex surface comprises, in transverse cross-section, first and second downwardly convex portions each comprising an outer, convex wall portion extending downwardly from said side wall to a lowermost point and an inner wall portion extending upwardly from said lowermost point towards the center of the base portion; and wherein said inner wall portions are generally convex, and said unoriented, relatively thick material is confined substantially to the upper most regions of said convex, inner wall portions; and wherein said convex, inner wall portions converge to form a cusp at the center of said base portion, and said unoriented, relatively thick material is confined substantially to the point of said cusp.

2. A container of blow-moulded oriented thermoplastic material of the type formed by enclosing a moulded preform in a mould corresponding to the shape of the container, heating the preform and stretching it to the full length of the mould so that its bottom surface impinges upon the bottom surface of the mould prior to blow-moulding; said container comprising a generally cylindrical body portion with a central longitudinal axis, said body portion having a side wall, a radius and a base portion closing the bottom end of said side wall, wherein said base portion is defined by a figure of rotation formed by rotating a generally convex curve, extending from the bottom end of said side wall to the central longitudinal axis of the body portion, about said axis so as to define an annular, convex surface having a central re-entrant portion, the material in the vicinity of the center of said re-entrant portion being unoriented and relatively thick in comparison with the oriented material of the remainder of the base portion and wherein said annular, convex surface comprises, in transverse cross-section, first and second downwardly convex portions each comprising an outer, convex wall portion extending downwardly from said side wall to a lowermost point and an inner wall portion extending upwardly from said lowermost point towards the center of the base portion; and wherein said inner wall portions are generally convex, and said unoriented, relatively thick material is confined substantially to the uppermost regions of said convex, inner wall portions; wherein the diameter of said re-entrant portion is in the range 5% to 30% of the overall diameter of said base portion.

3. A container as claimed in claim 2 wherein the diameter of said re-entrant portion is in the range 10% to 20% of the overall diameter of said base portion.

4. A container of blow-moulded oriented thermoplastic material of the type formed by enclosing a moulded preform in a mould corresponding to the shape of the container, heating the preform and stretching it to the full length of the mould so that its bottom surface impinges upon the bottom surface of the mould prior to blow-moulding; said container comprising a generally cylindrical body portion with a central longitudinal axis, said body portion having a side wall, a radius and a base portion enclosing the bottom end of said side wall, wherein said base portion is defined by a figure of rotation formed by rotating a generally convex curve, extending from the bottom end of said side wall to the central longitudinal axis of the body portion about said axis so as to define an annular, convex surface having a central re-entrant portion, the material in the vicinity of the center of said re-entrant portion being unoriented and relatively thick in comparison with the oriented material of the remainder of the base portion and wherein said annular, convex surface comprises, in transverse cross-section, first and second downwardly convex portions each comprising an outer, convex wall portion extending downwardly from said side wall to a lowermost point and an inner wall portion extending upwardly from said lowermost point towards the center of the base portion; and wherein said inner wall portions are generally convex, and said unoriented, relatively thick material is confined substantially to the uppermost regions of said convex, inner wall portions; and wherein the upper ends of said upwardly extending, convex inner wall portions are closed by a topmost surface extending therebetween, and wherein said unoriented relatively thick material is confined substantially to said topmost surface and the adjacent uppermost ends of said inner wall portions; and wherein the diameter of the re-entrant portion is in the range 10% to 20% of the overall diameter of said base portion.

5. A container as claimed in claim 4, wherein said topmost surface is substantially flat.

6. A container as claimed in claim 4, wherein said topmost surface is upwardly concave.

7. A container of blow-moulded oriented thermoplastic material of the type formed by enclosing a moulded preform in a mould corresponding to the shape of the container, heating the preform and stretching it to the full length of the mould so that its bottom surface impinges upon the bottom surface of the mould prior to blow-moulding; said container comprising a generally cylindrical body portion with a central longitudinal axis, said body portion having a side wall, a radius and a base portion closing the bottom end of said side wall, wherein said base portion is defined by a figure of rotation formed by rotating a generally convex curve, extending from the bottom end of said side wall to the central longitudinal axis of the body portion, about said axis so as to define an annular, convex surface having a central re-entrant portion, the material in the vicinity of the center of said re-entrant portion being unoriented and relatively thick in comparison with the oriented material of the remainder of the base portion and wherein sad annular, convex surface comprises, in transverse cross-section, first and second downwardly convex portions each comprising an outer, convex wall portion extending downwardly from said side wall to a lowermost point and an inner wall portion extending upwardly from said lowermost point towards the center of the base portion; wherein said inner wall portions are generally convex, and said unoriented, relatively thick material is confined substantially to the uppermost regions of said convex, inner wall portions; and wherein the upper ends of said upwardly extending, convex inner wall portions form a truncated cusp having a closed topmost surface, said unoriented relatively thick material being confined substantially to said topmost surface of said truncated cusp and the adjacent uppermost ends of said inner wall portions; and wherein the diameter of the re-entrant portion is in the range 10% to 20% of the overall diameter of said base portion.

8. A container as claimed in any one of claims 4 or 7, wherein the upper ends of said inner wall portions converge toward the longitudinal axis at an angle less than 60°.

9. A container as claimed in any one of claims 4 or 7, wherein the ratio of the thickness of said unoriented material to said oriented material is in the range of about 10:1.

10. A container of blow-moulded oriented thermoplastic material of the type formed by enclosing a moulded preform in a mould corresponding to the shape of the container, heating the preform and stretching it to the full length of the mould so that its bottom surface impinges upon the bottom surface of the mould prior to blow-moulding; said container comprising a generally cylindrical body portion with a central longitudinal axis, said body portion having a side wall, a radius and a base portion closing the bottom end of said side wall, wherein said base portion is defined by a figure of rotation formed by rotating a generally convex curve, extending from the bottom end of said side wall to the central longitudinal axis of the body portion, about said axis so as to define an annular, convex surface having a central re-entrant portion, the material in the vicinity of the center of said re-entrant portion being unoriented and relatively thick in comparison with the oriented material of the remainder of the base portion and wherein said annular, convex surface comprises, in transverse cross-section, first and second downwardly convex portions each comprising an outer, convex wall portion extending downwardly from said side wall to a lowermost point and an inner wall portion extending upwardly from said lowermost point towards the center of the base portion; and wherein said inner wall portions are generally convex, and said unoriented, relatively thick material is confined substantially to the uppermost regions of said convex, inner wall portions; and wherein said base portion includes a plurality of radial webs extending from the bottom of said body portion towards the centre of said base portion and including means dividing said convex annular surface into a plurality of feet spaced around the circumference of said base portion; and wherein said convex, inner wall portions converge to form a cusp at the center of said base portion, and said unoriented, relatively thick material is confined substantially to the point of said cusp.

11. A container of blow-moulded oriented thermoplastic material of the type formed by enclosing a moulded preform in a mould corresponding to the shape of the container, heating the preform and stretching it to the full length of the mould so that its bottom surface impinges upon the bottom surface of the mould prior to blow-moulding; said container comprising a generally cylindrical body portion with a central longitudinal axis, said body portion having a side wall, a radius and a base portion closing the bottom end of said side wall, wherein said base portion is defined by a figure of rotation formed by rotating a generally convex curve, extending from the bottom end of said side wall to the central longitudinal axis of the body portion, about said axis so as to define an annular, convex surface having a central re-entrant portion, the material in the vicinity of the center of said re-entrant portion being unoriented and relatively thick in comparison with the oriented material of the remainder of the base portion and wherein said annular, convex surface comprises, in transverse cross-section, first and second downwardly convex portions each comprising an outer, convex wall portion extending downwardly from said side wall to a lowermost point and an inner wall portion extending upwardly from said lowermost point towards the center of the base portion; and wherein said inner wall portions are generally convex, and said unoriented, relatively thick material is confined substantially to the uppermost regions of said convex, inner wall portions; and wherein said base portion includes a plurality of radial webs extending from the bottom of said body portion toward the centre of said base portion and including means dividing said convex annular surface into a plurality of feet spaced around the circumference of said base portion; and wherein the diameter of said re-entrant portion is in the range 5% to 30% of the overall diameter of said base portion.

12. A container as claimed in claim 11, wherein the diameter of said re-entrant portion is in the range 10% to 20% of the overall diameter of said base portion.

13. A container as claimed in claim 11, wherein said container has a capacity of at least one liter.

14. A container of blow-moulded oriented thermoplastic material of the type formed by enclosing a moulded preform in a mould corresponding to the shape of the container, heating the preform and stretching it to the full length of the mould so that its bottom surface impinges upon the bottom surface of the mould prior to blow-moulding; said container comprising a generally cylindrical body portion with a central longitudinal axis, said body portion having a side wall, a radius and a base portion closing the bottom end of said side wall, wherein said base portion is defined by a figure of rotation formed by rotating a generally convex curve, extending from the bottom end of said side wall to the central longitudinal axis of the body portion, about said axis so as to define an annular, convex surface having a central re-entrant portion, the material in the vicinity of the center of said re-entrant portion being unoriented and relatively thick in comparison with the oriented material of the remainder of the base portion and wherein said annular, convex surface comprises, in transverse cross-section, first and second downwardly convex portions each comprising an outer, convex wall portion extending downwardly from said side wall to a lowermost point and an inner wall portion extending upwardly from said lowermost point towards the center of the base portion; and wherein said lower wall portions are generally convex, and said unoriented, relatively thick material is confined substantially to the uppermost regions of said convex, inner wall portions; and wherein said base portion is provided with a plurality of generally convex stabilizing feet spaced around said annular, convex surface and extending downwardly from the outer wall portions thereof; wherein the upper ends of said upwardly extending, convex inner wall portions are closed by a topmost surface extending therebetween, and wherein said unoriented relatively thick material is confined substantially to said topmost surface and the adjacent upper ends of said inner wall portions; and wherein the diameter of the re-entrant portion is in the range 10% to 20% of the overall diameter of said base portion.

15. A container of blow-moulded oriented thermoplastic material of the type formed by enclosing a moulded preform in a mould corresponding to the shape of the container, heating the preform and stretching it to the full length of the mould so that its bottom surface impinges upon the bottom surface of the mould prior to blow-moulding, said container comprising a generally cylindrical body portion with a central longitudinal axis, said body portion having a side wall, a radius and a base portion closing the bottom end of said side wall wherein said base portion is defined by a figure of rotation formed by rotating a generally convex curve, extending from the bottom end of said side wall to the central longitudinal axis of the body portion, about said axis so as to define an annular, convex surface having a central re-entrant portion, the material in the vicinity of the center of said re-entrant portion being unoriented and relatively thick in comparison with the oriented material of the remainder of the base portion and wherein said annular, convex surface comprises, in transverse cross-section, first and second downwardly convex portions each comprising an outer, convex wall portion extending downwardly from said side wall to a lowermost point and an inner wall portion extending upwardly from said lowermost point towards the center of the base portion; and wherein said inner wall portions are generally convex, and said unoriented, relatively thick material is confined substantially to the uppermost regions of said convex, inner wall portions; and wherein said base portion includes a plurality of radial webs extending from the bottom of said body portion towards the centre of said base portion and including means dividing said convex annular surface into a plurality of feet spaced around the circumference of said base portions; and wherein the diameter of the re-entrant portion is in the range of 10% to 20% of the overall diameter of said base portion; and wherein the upper ends of said upwardly extending, convex inner wall portions form a truncated cusp having a closed topmost surface said unoriented relatively thick material being confined substantially to said topmost surface of said truncated cusp and the adjacent upper ends of said inner wall portions.

16. A container of blow-moulded oriented thermoplastic material of the type formed by enclosing a moulded preform in a mould corresponding to the shape of the container, heating the preform and stretching it to the full length of the mould so that its bottom surface impinges upon the bottom surface of the mould prior to blow-moulding; said container comprising a generally cylindrical body portion with a central longitudinal axis, said body portion having a side wall, a radius and a base portion closing the bottom end of said side wall, wherein said base portion is defined by a figure of rotation formed by rotating a generally convex curve, extending from the bottom end of said side wall to the central longitudinal axis of the body portion, about said axis so as to define an annular, convex surface having a central re-entrant portion, the material in the vicinity of the center of said re-entrant portion being unoriented and relatively thick in comparison with the oriented material of the remainder of the base portion and wherein said annular, convex surface comprises, in transverse cross-section, first and second downwardly convex portions each comprising an outer, convex wall portion extending downwardly from said side wall to a lowermost point and an inner wall portion extending upwardly form said lowermost point towards the center of the base portion; and wherein said inner wall portions are generally convex, and said unoriented, relatively thick material is confined substantially to the uppermost regions of said convex, inner wall portions; and wherein said base portion is provided with a plurality of generally convex stabilizing feet spaced around said annular, convex surface and extending downwardly from the outer wall portions thereof; and wherein said convex, inner wall portions converge to form a cusp at the center of said base and said unoriented, relatively thick material is confined substantially to the point of said cusp.

17. A container of blow-moulded oriented thermoplastic material of the type formed by enclosing a moulded preform in a mould corresponding to the shape of the container, heating the preform and stretching it to the full length of the mould so that its bottom surface impinges upon the bottom surface of the mould prior to blow-moulding; said container comprising a generally cylindrical body portion with a central longitudinal axis, said body portion having a side wall, a radius and a base portion closing the bottom end of said side wall, wherein said base portion is defined by a figure of rotation formed by rotating a generally convex curve, extending from the bottom end of said side wall to the central longitudinal axis of the body portion, about said axis so as to define an annular, convex surface having a central re-entrant portion, the material in the vicinity of the center of said re-entrant portion being unoriented and relatively thick in comparison with the oriented material of the remainder of the base portion and wherein said annular, convex surface comprises, in transverse cross-section, first and second downwardly convex portions each comprising an outer, convex wall portion extending downwardly form said side wall to a lowermost point and an inner wall portion extending upwardly from said lowermost point towards the center of the base portion, and wherein said inner wall portions are generally convex, and said unoriented, relatively thick material is confined substantially to the uppermost regions of said convex, inner wall portions; and wherein said base portion is provided with a plurality of generally convex stabilizing feet spaced around said annular, convex surface and extending downwardly from the outer wall portions thereof; and wherein the diameter of said re-entrant portion is in the range 5% to 30% of the overall diameter of said base portion.

18. A container as claimed in claim 17 wherein the diameter of said re-entrant portion is in the range 10% to 20% of the overall diameter of said base portion.

19. A container of blow-moulded oriented thermoplastic material of the type formed by enclosing a moulded preform in a mould corresponding to the shape of the container, heating the preform and stretching it to the full length of the mould so that its bottom surface impinges upon the bottom surface of the mould prior to blow-moulding; said container comprising a generally cylindrical body portion with a central longitudinal axis, said body portion having a side wall, a radius and a base portion closing the bottom end of said side wall, therein said base portion is defined by a figure of rotation formed by rotating a generally convex curve, extending from the bottom end of said side wall to the central longitudinal axis of the body portion, about said axis so as to define an annular, convex surface having a central re-entrant portion, the material in the vicinity of the center re-entrant portion being unoriented and relatively thick in comparison with the oriented material of the remainder of the base portion and wherein said annular, convex surface comprises, in transverse cross-section, first and second downwardly convex portions each comprising an outer, convex wall portion extending downwardly from said side wall to a lowermost point and an inner wall portion extending upwardly from said lowermost point towards the center of the base portion; and wherein said inner wall portions are generally convex, and said unoriented, relatively thick material is confined substantially to the uppermost regions of said convex, inner wall portions; and wherein said base portion is provided with a plurality of generally convex stabilizing feet spaced around said annular, convex surface and extending downwardly from the outer wall portion thereof; and wherein the upper ends of said upwardly extending, convex inner wall portions are closed by a topmost surface extending therebetween, and wherein said unoriented relatively thick material is confined substantially to said topmost surface and the adjacent upper ends of said inner wall portions, and wherein the diameter of said re-entrant portion is in the range 10% to 20% of the overall diameter of said base portion.

20. A container as claimed in any one of claim 14, 15, 18 or 19 wherein the outer convex wall portion and inner convex wall portion of the base portion form a continuous curve, the radius of which is greater than half of the radius of said cylindrical body portion.

21. A container as claimed in any one of claims 14, 14, 18 or 19 wherein a straight line portion is incorporated into the outer convex wall portions of the base portion to form an upwardly diverging frusto-conical section around the outside portion of the base portion.

22. A container as claimed in any one of claims 14, 15, 18 or 19 wherein the outer convex wall portion and inner convex wall portion of the base portion form a continuous curve, the outer convex wall portion of the base portion including a first convex arcuate portion having a radius greater than half of the radius of said cylindrical body portion and extending from the bottom of the cylindrical wall portion of the container; second convex arcuate portion which forms a lower apex of the base portion and has a radius less than the radius of said cylindrical body portion; and a third convex arcuate portion formed as part of the inner convex wall portion of the base portion, having a radius greater than the radius of said cylindrical body portion and extending upwardly towards the centre of the bottle.

23. A container of blow-moulded oriented thermoplastic material of the type formed by enclosing a moulded preform in a mould corresponding to the shape of the container, heating the preform and stretching it to the full length of the mould so that its bottom surface impinges upon the bottom surface of the mould prior to blow-moulding; said container comprising a generally cylindrical body portion with a central longitudinal axis, said body portion having a side wall, a radius and a base portion closing the bottom end of said side wall, wherein said base portion is defined by a figure of rotation formed by rotating a generally convex curve, extending from the bottom end of said side wall to the central longitudinal axis of the body portion, about said axis so as to define an annular, convex surface having a central re-entrant portion, the material in the vicinity of the center of said re-entrant portion being unoriented and relatively thick in comparison with the oriented material of the remainder of the base portion and wherein said annular, convex surface comprises, in transverse cross-section, first and second downwardly convex portions each comprising an outer, convex wall portion extending downwardly from said side wall to a lowermost point and an inner wall portion extending upwardly from said lowermost point towards the center of the base portion; and wherein said inner wall portions are generally convex, and said unoriented, relatively thick material is confined substantially to the uppermost regions of said convex, inner wall portions; and wherein said base portion is provided with a plurality of generally convex stabilizing feet spaced around said annular, convex surface and extending downwardly from the outer wall portions thereof; and wherein the upper ends of said upwardly extending inner wall portions forms a truncated cusp having a closed topmost surface, said unoriented relatively thick material being confined substantially to said topmost surface of said truncated cusp and the adjacent upper ends of said inner wall portions; and wherein the diameter of the re-entrant portion is in the range 10% to 20% of the overall diameter of said base portion.

24. A container as claimed in any one of claims 14, 15, 19 or 23 wherein said topmost surface is substantially flat.

25. A container as claimed in any one of claims 14, 15 19 or 23 wherein said topmost surface is upwardly concave.

26. A container as claimed in any one of claims 14, 15, 19 or 23 wherein the upper ends of said inner wall portions converge toward the longitudinal axis at an angle less than 60°.

27. A container as claimed in any one of claims 14, 15, 19 or 23 wherein the ratio of the thickness of said unoriented material to said oriented material is in the range of about 10:1.

28. A container as claimed in any one of claims 14, 15, 19 or 23 wherein there are six equally spaced feet provided around the base portion.

*29. A container of blow-moulded oriented thermoplastic material, said container comprising a generally cylindrical body portion with a central longitudinal axis, said body portion having a side wall, a radius and a base portion*

*closing the bottom end of said side wall, wherein said base portion is defined by a figure of rotation, formed by rotating a generally convex curve extending from the bottom end of said side wall to the central longitudinal axis of the body portion, about said axis so as to define a bottom surface having a central re-entrant portion; the material in the vicinity of the center of said re-entrant portion being unoriented and relatively thick in comparison with the oriented material of the remainder of the base portion; and wherein said bottom surface comprises, in transverse cross-section, first and second downwardly convex portions each comprising an outer, convex wall portion extending downwardly from said side wall and an inner wall portion extending from said outer, convex wall portion towards the center of the base portion; wherein said unoriented, relatively thick material is confined substantially to said re-entrant portion and wherein the diameter of said re-entrant portion is in the range of 5% to 30% of the overall diameter of said side wall.*

*30. The container of claim 29 wherein said base portion is provided with a plurality of generally convex stabilizing feet spaced around said base portion and extending downwardly from the outer portion thereof.*

*31. The container of claim 29 wherein the diameter of said re-entrant portion is in the range of 10% to 20% of the overall diameter of said side wall.*

*32. A container of blow-moulded oriented thermoplastic material, said container comprising a generally cylindrical body portion with a central longitudinal axis, said body portion having a side wall, a radius and a base portion closing the bottom end of said side wall, wherein said base portion is defined by a figure of rotation, formed by rotating a generally convex curve extending from the bottom end of said side wall to the central longitudinal axis of the body portion, about said axis so as to define a bottom surface; the material in the vicinity of the center of said bottom surface being unoriented and relatively thick in comparison with the oriented material of the remainder of the base portion; and wherein said bottom surface comprises, in transverse cross-section, first and second downwardly convex portions each comprising an outer, convex wall portion extending downwardly from said side wall and an inner wall portion extending from said outer, convex wall portion towards the center of said bottom surface; wherein said unoriented, relatively thick material is confined substantially to the center of said bottom surface wherein the diameter of said unoriented relatively thick material is in the range of 5% to 30% of the overall diameter of said side wall.*

*33. The container of claim 32 wherein the diameter of said unoriented relatively thick material is in the range of 10% to 20% of the overall diameter of said side wall.*

*34. The container of claim 32 wherein said base portion is provided with a plurality of generally convex stabilizing feet spaced around said base portion and extending downwardly from the outer wall portion thereof.*

*35. A container of blow-moulded oriented thermoplastic material, said container comprising a generally cylindrical body portion with a central longitudinal axis, said body portion having a side wall, a radius and a base portion closing the bottom end of said side wall, wherein said base portion is defined by a figure of rotation, formed by rotating a generally convex curve, extending from the bottom end of said side wall to the central longitudinal axis of the body portion, about said axis so as to define a bottom surface; the material in the vicinity of the center of said bottom surface being unoriented and relatively thick in comparison with the oriented material of the remainder of the base portion; and wherein said bottom surface comprises, in transverse cross-section, first and second downwardly convex portions each comprising an outer, convex wall portion extending downwardly from said side wall and an inner wall portion extending from said outer, convex wall portion towards the center of said bottom surface; wherein said unoriented, relatively thick material is confined substantially to the center of said bottom surface and wherein the thickness of the material in the range of up to 30% of the overall diameter of said side wall is from 1.2 times to 10 times the thickness of the material of the remainder of the base portion.*

*36. The container of claim 35 wherein the thickness of the material in the range of up to 30% of the overall diameter of said sidewall is from 1.95 times to 7.14 times the thickness of the material of the remainder of the base portion.*

*37. A container of blow-moulded oriented thermoplastic material, said container comprising a generally cylindrical body portion with a central longitudinal axis, said body portion having a side wall, a radius and a base portion closing the bottom end of said side wall, wherein said base portion is defined by a figure of rotation, formed by rotating a generally convex curve, extending from the bottom end of said side wall to the central longitudinal axis of the body portion, about said axis so as to define a bottom surface; the material in the vicinity of the center of said bottom surface being unoriented and relatively thick in comparison with the oriented material of the remainder of the base portion; and wherein said bottom surface comprises, in transverse cross-section, first and second downwardly convex portions each comprising an outer, convex wall portion extending downwardly from said side wall and an inner wall portion extending from said outer, convex wall portion towards the center of said bottom surface; wherein said unoriented, relatively thick material is confined substantially to the center of said bottom surface and wherein the thickness of the material in the range of up to 20% of the overall diameter of said side wall is from 1.2 times to 10 times the thickness of the material of the remainder of the base portion.*

*38. The container of claim 37 wherein the thickness of the material in the range of up to 20% of the overall diameter of said sidewall is from 1.95 times to 7.14 times the thickness of the material of the remainder of the base portion.*

*39. The container as in any of claims 1–7, 10–19, 23, 29, 30, 35, 36, or 37–38 under internal pressure provided by contents in the container.*

*40. The container of claim 39 wherein said contents comprise a liquid.*

*41. The container of claim 40 wherein said liquid is a drink.*

*42. The container of claim 41 wherein said drink is a carbonated drink.*

* * * * *